United States Patent [19]

Hill

[11] Patent Number: 4,999,562
[45] Date of Patent: Mar. 12, 1991

[54] JUMPER TERMINAL SYSTEM

[76] Inventor: William L. Hill, 5017 Thorne, La Mesa, Calif. 92041

[21] Appl. No.: 253,771

[22] Filed: Oct. 5, 1988

[51] Int. Cl.[5] .............................................. H02J 7/00
[52] U.S. Cl. .......................................... 320/7; 320/16; 307/71
[58] Field of Search ........................ 320/6, 7, 8, 15, 16, 320/2, 3, 4; 307/71

[56] References Cited

U.S. PATENT DOCUMENTS

| | | | |
|---|---|---|---|
| 2,096,378 | 10/1937 | Mitchell | 320/7 X |
| 2,344,568 | 3/1944 | Snyder | 320/7 X |
| 4,081,738 | 3/1978 | Roller | 320/7 |
| 4,233,552 | 11/1980 | Baumbach | 320/7 |
| 4,412,137 | 10/1983 | Hansen et al. | 307/71 X |
| 4,564,797 | 1/1986 | Binkley | 320/7 X |

Primary Examiner—Steven L. Stephan
Assistant Examiner—Kristine Peckman

[57] ABSTRACT

An add-on electrical means for an automotive power supply having 24 volt operation during the engine cranking period and 12 volt operation during normal-run periods. The add-on electrical means enables the vehicle to selectively provide 24 volt jumper voltage or 12 volt jumper voltage to adjacent vehicles; a manual switch is provided to select the jumper voltage. The add-on system can be incorporated into existing vehicle electrical systems at relatively low expense. The add on system also provides a capability to charge the vehicle batteries from an external source.

2 Claims, 1 Drawing Sheet

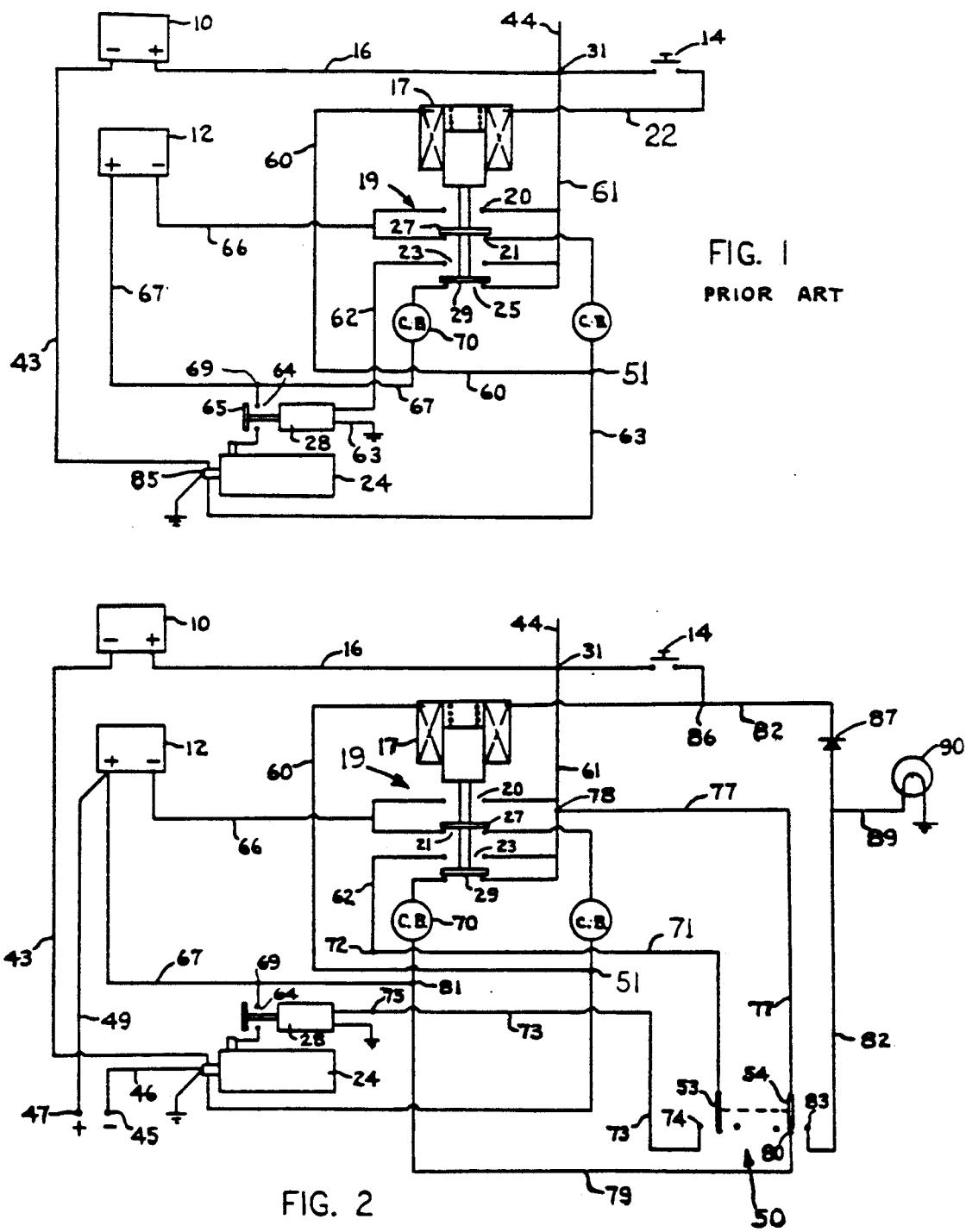

JUMPER TERMINAL SYSTEM

BACKGROUND OF THE INVENTION

This invention relates to automotive electrical systems, especially systems used in large trucks and over-the road tractors. A particular aim of the invention is to provide large vehicles with the capability to supply other vehicles with electrical power to two selected voltages, e.g. 12 volts or 24 volts. Such power may be required when the other vehicle battery system is in a discharged (dead) condition. The present invention facilitates the process of jumping electrical power from a charged system to a discharged system, whether the discharged system is 12 volt or 24 volt.

SUMMARY OF THE INVENTION

Many large truck electrical systems include switching mechanisms whereby the starter motor is supplied with 24 volt electrical power during the engine cranking period, and whereby the electrical components are supplied with 12 volt power during normal engine-run periods (when 24 volt power is not needed). My invention is in the nature of an add-on system of switches for such electrical systems, whereby the add-on components selectively supply 24 volt power or 12 volt power to jumper terminals on-board the vehicle. The invention permits jumping power to other trucks (using 24 volts) or other smaller vehicles (using 12 volts).

THE DRAWINGS

FIG. 1 schematically illustrates a conventional electrical power system used in large trucks.

FIG. 2 shows the FIG. 1 system modified in accordance with my invention.

DESCRIPTION OF A PREFERRED EMBODIMENT OF THE INVENTION

FIG. 1 shows a vehicle electrical power supply system that includes a first battery means 10 and a second battery means 12. In practice each battery means can be two twelve volt batteries connected in parallel to provide increased amperage. The two battery means 10 and 12 are connectable in series during the engine crank period and in parallel during other periods.

The system comprise an ignition switch 14 that receives power through line 16 to energize the solenoid winding 17 of a controller switch (or relay) 19 via line 22. Winding 17 is connected to ground via line 60, junction 51, line 63, and grounded post 85 on engine starter motor 24. A ground line 43 is connected between the negative terminal on battery means 10 and grounded post 85.

Controller switch 19 includes four sets of contacts indicated by numerals 20, 21, 23 and 25. The solenoid armature has two contact bars 27 and 29 arranged so that bar 27 alternately closes contacts 20 and 21, and bar 29 alternately closes contacts 23 or 25. The contact bars are shown in positions they would have with the solenoid winding de-energized.

When ignition switch 14 is manually closed winding 17 is energized so that contacts 23 are closed (by contact bar 29). A circuit is thereby completed from battery 10 through line 16 to junction 31, line 61, contacts 23, line 62, relay (winding) 28, and ground line 63. Relay contacts 64 are thereby closed by relay switch arm 65.

Starter motor 24 is energized through a circuit that comprises battery 10 (plus terminal), line 16, junction 31, line 61, contacts 20, line 66, battery 12, line 67, junction 69, contacts 64, the starter motor, and grounded post 85. Batteries 10 and 12 are in series to provide twenty four volt starting voltage.

When ignition switch 14 is returned to an open condition contact bars 27 and 29 return to the conditions shown in FIG. 1. Batteries 10 and 12 are then in electrical parallelism. Battery 10 delivers voltage through line 16 to junction 31. Battery means 12 delivers electrical power to junction 31 through a circuit that includes line 67, circuit breaker 70, contacts 25 and line 61. A line 44 extends from junction 31 to an alternator, other componentry in the vehicle electrical system.

This system shown in FIG. 1 is representative of electrical systems now used in various diesel engine truck and over-the-road tractors. My invention relates to a system of add-on switches 53 and 54 and diode 87 applied to the FIG. 1 system for giving the system a selective 12 volt or 24 volt jumper capability. FIG. 2 shows the FIG. 1 system modified to incorporate my invention.

Referring to FIG. 2, a negative jumper cable terminal 45 is shown connected to the negative battery terminal of battery means 10 via line 46. A positive jumper cable terminal 47 is connected to the positive terminal of battery means 12 via a line 49. Terminals 45 and 47 are located at an accessible point on the vehicle where jumper cables can be attached and extended to another adjacent vehicle.

My add-on system further includes a manual switch means 50 having two switch arms 53 and 54 connected together for conjoint movement. The dashed line shown in FIG. 2 between switch arms 53 and 54 is intended to designate a mechanical connection between the two switches. Switch means 50 may be key-operated for security purposes. The two switch arms 53 and 54 can be moved (swung) between three positional settings. In the illustrated positions of switch arms 53 and 54 the modified system can be used to provide twelve volt starting power (at terminals 45 and 47) for another vehicle. When switch arms 53 and 54 are swung to the right the modified system can provide twenty four volt starting power for another vehicle. When switch arms 53 and 54 are swung to the left the battery means can provide twenty four volt starting power to the on-board starter motor 24 (conventional starting mode).

My add-on system comprises a new line 71 extending from junction 72 to switch arm 54, and a new line 73 extending from switch contact 74 to junction 75; junctions 72 and 75 are formed by cutting line 62. New lines 71 and 73 enable switch arm 53 to control current flow to relay winding 28.

My add-on system further comprises a new line 77 extending from junction 78 to switch arm 54, another new line 79 extending from switch contact 80 to junction 81, and an additional new line 82 extending from switch contact 83 to junction 86. Line 82 includes a diode 87. This new circuitry is in electrical parallelism with ignition switch 14.

As an optional feature, line 89 may be extended from line 82 to an indicator lamp 90 on the vehicle dashboard. The purpose is to alert the driver when switch arm 54 is swung to the right (i.e. to a position in which the starter motor cannot be energized).

With switch arms 53 and 54 in their illustrated positions the system provides twelve volt jumper power at terminals 47 and 45; starter motor 24 cannot be energized because relay winding 28 is effectively out of the circuit. Battery 10 has its plus terminal connected to the plus terminal of battery 12 through a circuit that includes line 16, junction 31, line 61, junction 78, line 77, switch arm 54, line 79, junction 81, and line 67.

With switch arms 53 and 54 swung to the left a circuit is established through lines 71 and 73. The on-board starter motor 24 can be energized with the same procedure that is used with the FIG. 1 system. The only difference is that current flow between junctions 72 and 75 takes place through the new circuit components 71, 53 and 73. The motorist notices no difference in starting procedure.

With switch arms 53 and 54 swung to the right the system can provide twenty four volt jumper voltage to terminals 47 and 45. Lines 77 and 82 form a latching circuit to keep winding 17 energized without need for closing ignition switch 14. With winding 17 energized, the system delivers twenty four volts to terminals 47 and 45 through a circuit that includes the battery 10 plus terminal, line 16, junction 31, line 61, contacts 20, line 66, battery 12, and line 49. Relay winding 28 is out-of-circuit, such that starter motor 24 does not turn over (even though switch 14 might be closed).

By way of summarization, the add-on componentry enables the system to provide twelve volt power at terminals 47 and 45, or twenty four volt power at those terminals, depending on the adjusted positions of switch arms 53 and 54. When switch arms 53 and 54 are swung to the left the starting system operates in normal fashion.

When switch arms 53 and 54 are in their FIG. 2 positions terminals 47 and 45 can be used as "charging" terminals to recharge both batteries 10 and 12. Battery 12 is supplied with charging current through line 49. Battery 10 is supplied with charging current through a circuit that includes line 67, junction 81, line 79, switch arm 54, line 77, junction 78, line 61, junction 31, and line 16.

The drawings illustrate one form that the invention can take. Other forms are possible, depending partly on the nature of the electrical supply system to which the invention is applied.

I claim:
1. An automotive electrical system comprising a first battery means (10) having a positive terminal and a negative terminal; a second battery means (12) having a positive terminal and a negative terminal; a starter motor having a positive terminal and a negative terminal; a starter motor relay having a controlled set of contacts for energizing the starter motor; a controller switch that includes a solenoid winding, first normally-open contacts connected between the positive terminal of the first battery means and the negative terminal of the second battery means, second normally-closed contacts connected between the negative terminal of the second battery means and the negative terminal of the starter motor, third normally-open contacts connected to the positive terminal of the first battery means, and fourth normally-closed contacts connected between the positive terminal of the first battery means and said controlled set of contacts, an ignition switch connected between the positive terminal of the first battery means and said solenoid winding; a first jumper cable terminal having a continuous electrical connection to the negative terminal of the first battery means and the negative terminal of the starter motor; a second jumper cable terminal connected to the positive terminal of the second battery means; a first manual switch element having a circuit-open position, and a circuit-closed position between said third normally-open contacts and the starter motor relay; and a second manual switch element having a first circuit-open position, a first circuit-closed position between the positive terminal of the first battery means and the fourth normally-closed contacts, and a second circuit-closed position between the positive terminal of the first battery means and said solenoid winding.

2. The electrical system of claim 1, and further comprising a mechanical connection between said first and second manual switch elements, whereby said first switch element is in said circuit-open position when said second switch element is in said first circuit-closed position, and said first switch element is in said circuit-closed position when said second switch element is in said first circuit-open position, and said first switch element is in said circuit-open position when said second switch element is in said second circuit-closed position.

* * * * *